Nov. 11, 1947.  J. TOUBORG  2,430,692
REFRIGERATING SYSTEM AND DRYING MEANS THEREFOR
Filed March 12, 1945  2 Sheets-Sheet 1

INVENTOR.
Jens Touborg
BY Albert R. Henry
Attorney

Patented Nov. 11, 1947

2,430,692

UNITED STATES PATENT OFFICE 2,430,692

REFRIGERATING SYSTEM AND DRYING MEANS THEREFOR

Jens Touborg, Tecumseh, Mich., assignor to Tecumseh Refrigeration Sales and Engineering Company, Tecumseh, Mich., a corporation of Michigan Application March 12, 1945, Serial No. 582,392

7 Claims. (Cl. 62—115)

This invention relates to a refrigerating system and to drying means therefor, and it has particular reference to the provision of a drying unit, and its organization in the refrigerating system, in such manner that moisture is so eliminated from the system as to render it substantially anhydrous.

The circuit for the usual type of refrigerating system, comprising a compressor, condenser, expansion valve, and evaporator connected in a closed circuit, is of course so well known that no space need be devoted here to a detailed description. It is also well known that the refrigerants and lubricants used in such systems contain varying quantities of water, and that such water often interferes with satisfactory operation, either corrosively, as by forming an acid with sulphur dioxide, or physically, as by separating at the valve and there freezing to prevent the flow of the refrigerant. In order to overcome the adverse effects of water, it has also been proposed to incorporate a drying element in the circuit adjacent the compressor or condenser, the theory being that as the wet refrigerant flows through the drier, some of the excess water will be removed.

Despite the claims made for such driers, the simple fact remains that innumerable service failures and customer complaints still result from residual moisture, so that the entrained or dissolved water has continued to be a serious source of trouble. According to the present invention, however, it is now possible to reduce the water to an extremely low value, say of the order of not more than five parts per million. When such dehydration is effected, the system becomes anhydrous for all practical purposes, and accordingly failures due to water in the circuit may be made non-existent.

According to one aspect of the present invention, the desired result is obtained by utilizing a hydrophilic adsorbing agent as the drying medium, and making the container for such agent a part of the evaporating element, or "low side," of the refrigerating circuit. In one embodiment of the invention, this may be done by disposing the drier between the discharge end of the expansion valve or capillary tube and the inlet side of the evaporator proper. The drier, if not a detachable or separate component of the circuit, may also be built into or as a part of the evaporator. Again, and according to another embodiment particularly applicable to field service work, the drier assembly may be assembled as a separate evaporator and in parallel (rather than series) circuit relationship to the main evaporator.

According to another aspect of the invention, there is provided a drying element comprising a shell or casing adapted to contain the drying agent, to which is connected a capillary tube having a fitting at its free end, and a second connector at the opposite and discharge end, thus providing a combined drier and small evaporator through which the refrigerant may flow for simultaneous expansion and dehydration.

The principles of the invention, and practical modes of applying the same, will become apparent from the following description of typical embodiments, illustrated in the accompanying drawings, wherein.

Figure 1:
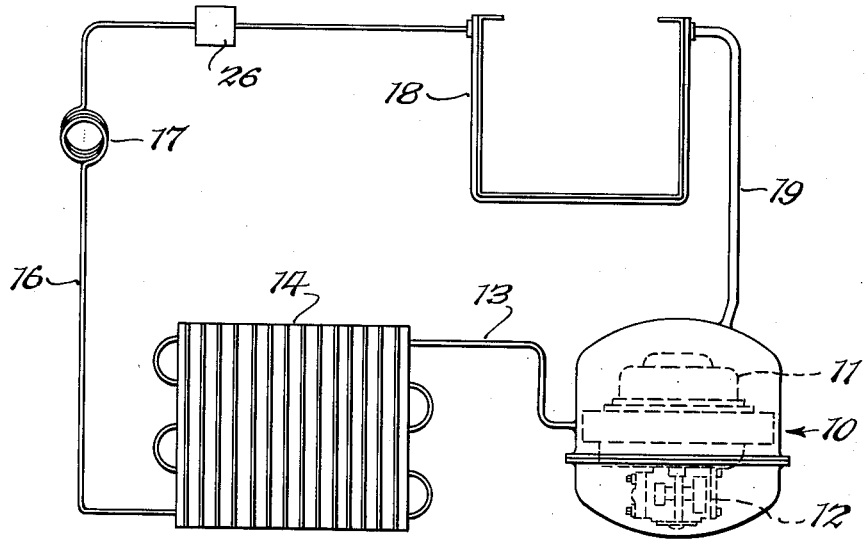
Fig. 1 is a schematic view of a refrigerating circuit incorporating the present invention.

The refrigerating system shown in Fig. 1 comprises a compressor 10, herein shown as being of the hermetically sealed type, and including an impervious casing within which is mounted an electric motor 11 and a directly connected compressor 12. As the details of such compressors are not a part of the present invention, more replete illustration is deemed unnecessary, but reference may be made to my prior Patent No. 2,274,943 of March 3, 1942, as more fully illustrating such a compressor. After undergoing compression, the hot refrigerant flows through a discharge line 13 through the convolutions of a condenser 14, which may be air-cooled by an auxiliary fan 15 (see Fig. 2). This extraction of heat reduces in some degree both the pressure and temperature of the refrigerant, although both are quite high compared to normal atmospheric conditions, as will be discussed more fully hereinafter.

The mixed vaporous and liquid refrigerant emerging from the condenser 14 then flows through a supply line 16 into a valve device, herein shown as a capillary tube or restrictor 17, whose discharge side is connected to an evaporator 18, which may be, as illustrated, of the domestic box type. The refrigerant is throttled in passing the valve, expanding at its discharge side and further expanding in the evaporator, so that it becomes quite cold and is therefore capable of absorbing heat from the storage compartment and its contents. The evaporated and expended refrigerant is then returned to the compressor 10 by means of a suction line 19, thus completing the closed circuit.

Figure 2:
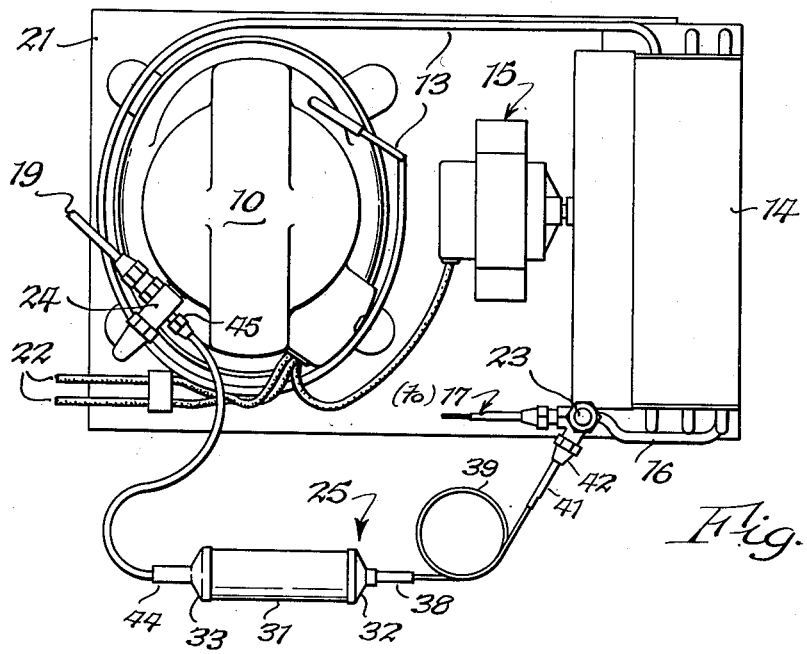
Fig. 2 is a plan of the high side, or compressor-condenser portion of a refrigerator showing an alternative arrangement.

In Fig. 2, the compressor 10 and condenser 14 with attendant parts as just described are shown as mounted on a platform 21, thus making a subassembly which can be located in the bottom of the refrigerator box. It will also be seen that this equipment is provided with line wires 22 for the electric motors 11 and 15, and with conventional fittings including shut-off valves 23 and 24, respectively positioned between the condenser 14 and the capillary tube 17, and the suction line 19 and the compressor 10. Fig. 2 differs from Fig. 1, however, in that Fig. 2 includes a drying unit assembly, generally designated by the reference numeral 25, which is directly connected between the supply line 16 and the suction line 19, by making use of the fittings 23 and 24. In Fig. 1, a drier 26 corresponding to a part of the unit 25, is connected in series between the discharge end of the capillary tube 17 and the inlet side of the evaporator 18.

Figure 3:
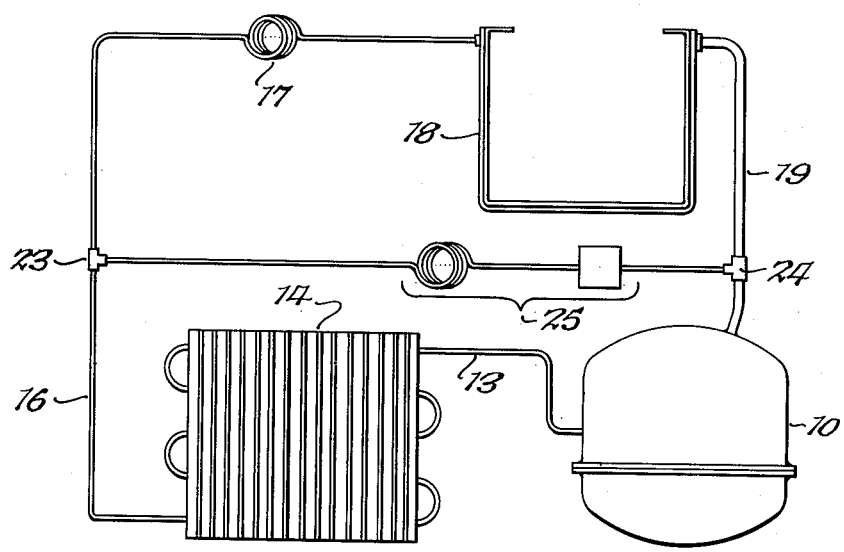
Fig. 3 is a schematic view of a refrigerating circuit incorporating the arrangement shown in Fig. 2.

A complete system incorporating the drying unit assembly 25 is shown schematically in Fig. 3, similar reference numerals being used throughout to designate corresponding parts. It will be seen that the circuit of Fig. 3 does not include the drier 26 as shown in Fig. 1, although it should be made clear that it may include it in the same manner if desired. On the other hand, the circuit of Fig. 3, as in Fig. 2, incorporates the drying unit assembly 25 positioned in parallel to the capillary tube 17 and evaporator 18, thus in effect making two evaporative paths instead of one.

Figure 4:
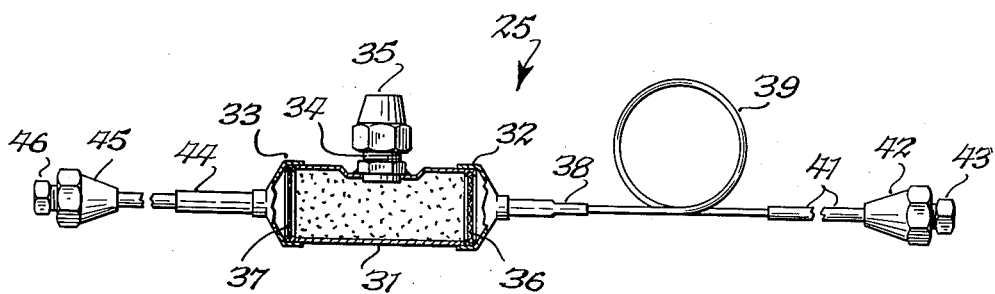
Fig. 4 is a view, partly in section and partly in elevation, of the drying unit.

A suitable form for the drying unit assembly 25 (and which assembly may also be regarded as corresponding to the parts 17 and 26 of Fig. 1 if that figure alone is considered) is shown in Fig. 4. The unit comprises a tubular casing 31 provided with end caps 32 and 33 which are soldered or otherwise secured in place. The side wall of the casing 31 is also pierced to receive a threaded nipple 34 which may be covered with a protective cap 35. The ends of the casing 31 are also fitted with wire mesh filters 36 and 37, the filter 37 advantageously being finer or having several layers, as this is the discharge end of the casing. The cap 32, at the inlet end, is pierced to receive the discharge end of a tube 38, which merges into a capillary tube 39 disposed in a coil, and being for example about four feet long and having an internal diameter of forty thousandths of an inch. The opposite end of the capillary tube is connected to a tube 41 of greater diameter, formed at its extremity with a flare to receive a tapped coupling 42 which in turn receives a plug 43. The casing 31 may also be provided with an arrow or other distinctive mark to show the correct path for the refrigerant.

The cap 33 on the discharge end is also pierced to receive a length of tubing 44 of relatively large diameter and of any suitable length, whose free end is provided with a coupling or flare nut 45 and a plug 46. Before being placed into service, the space within the casing 31, and between the filters 36 and 37, is filled with a suitable and activated drying or water-removing agent, by removing the plug 35 and filling or recharging through the nipple 34. Such an agent may be silica gel, which is understood to be a colloidal form of silica prepared by coagulation of silica hydrosol and subsequent dehydration. As now available, this material, when activated, possesses the property of preferentially adsorbing water from organic solvents such as refrigerants or lubricating oils, in other words, it possesses the characteristics of a hydrophilic adsorbent. Activated alumina may be referred to as another example, although it does not appear to be so effective on a basis of equal quantities.

With the foregoing description of typical embodiments of physical forms of the invention in mind, a discussion will now be undertaken of the results which may be obtained. The refrigerant called "Freon" or "F–12" (dichlorodifluoromethane, $CCl_2F_2$) will be taken as a sufficient example of the working fluid in the circuit, and silica gel will be taken as the dehydrating agent. Heretofore, it has been recognized that such refrigerant is capable of dissolving enough water to cause trouble in the refrigerating system, the solubility of the water being as much as two hundred parts per million at 100° Fahr., and sixty parts per million at freezing temperature, or 32° Fahr.

It can therefore be appreciated that if the refrigerant is charged into the system on a warm day, or if through some inadvertence the apparatus is not adequately dehydrated at the factory, enough water may be contained in the refrigerant to separate when the wet refrigerant flows through the expansion valve device with concurrent cooling. This effect is particularly noticeable when using capillary tubes, because the separating water is apt to freeze in its small bore, thus plugging the system and leading to a service failure. It may moreover be observed that when a hermetically sealed type of compressor is employed, the effect may be aggravated. This is due to the circumstance that the compressor must then work harder, the motor is overloaded, and the motor heat tends to break down the insulation with release of further quantities of moisture. Having this motor condition in mind, it has been found that an initially "dry" system will in such case suffer an increase in the moisture content to a point where the water will freeze at the capillary.

As noted at the outset of this specification, it is recognized that drying elements have heretofore been incorporated in refrigerating circuits to eliminate moisture, but insofar as I am aware or have been able to determine, their location has been on the high side of the circuit. In any such location, the dehydrating agent, such as the silica gel considered by way of example, is subjected to compressed refrigerant at relatively high temperature, which may be from over 100° to 200° Fahr. It is not until the refrigerant passes through the expansion valve and into the evaporator that significantly lower temperatures occur.

However, at these high temperatures, the silica gel has a comparatively low power to adsorb or accept the moisture from the refrigerant, inasmuch as the dehydrating property decreases with a rise in temperature and with the proportionate amount adsorbed. Again, as the temperature of the gel is increased, the partial pressure of the moisture taken up thereby is also increased, with the result that some of the adsorbed moisture may be released to the system when conditions change. As a further example, it may be shown by analyses and by actual service conditions that it is extremely difficult, if not practically impossible, to dehydrate the refrigerant to less than twenty to thirty parts per million under these conditions.

Referring now to Fig. 1, it will be seen that the silica gel container 26 is positioned between the capillary tube 17 and the evaporator 18, and that the container, as made clear in connection with the description of Fig. 4, is of larger cross-sectional area than the capillary tube 17 discharging refrigerant into it. Accordingly, as the refrigerant emerges through the tube and into the container 26, it expands and proportionally undergoes a reduction of temperature. The energy of the refrigerant accordingly cools the silica gel and thus automatically conditions it so that its capacity to adsorb the entrained moisture is greatly increased. Accordingly, the solubility of the moisture in the refrigerant is decreased and the ability of the dehydrating agent to take up moisture is increased so that when operating at a temperature adjacent the capillary tube close to freezing, the residual moisture content in the Freon can be reduced to a value of less than five parts per million. Inasmuch as the container 26 is continually exposed to these low temperatures, re-solution of the adsorbed moisture is practically impossible.

The parallel circuit arrangement shown in Figs. 2 and 3 is particularly useful when it is desired to dry out a refrigerator which has given trouble due to high moisture content. It may be used both in the factory or in the field. In order to make a dehydrating operation, the service man proceeds as follows: The plug 43 is removed from the inlet end of the capillary tube 39 and the nut 42 is connected to a service drum containing refrigerant. The plug 46 is next removed. Enough refrigerant is passed through the unit 25 to eliminate any air which may be entrapped therein. The nut 45 is then connected to the service fitting 24 and then the drum of refrigerant is disconnected and the inlet nut 42 is connected to the service fitting 23. The assembly 25 has now been placed in parallel relationship to the capillary tube 17 and the evaporator 18, and of course on the low side of the system.

The evaporator is now defrosted if it happens to be coated with ice, and the fan 15 is blocked and the condenser 14 is covered with paper or cloth so that there will be a higher temperature existing at this part of the apparatus. This step is desirable to increase the solvent action of the refrigerant and thereby dissolve all of the moisture which may be located in the affected parts. The control switch for the motor 11 is then moved to closed position and the apparatus is run for a suitable period of time, or say about two hours. As the refrigerant circulates, part of it will of course flow through the capillary tube 17 and the evaporator 18, and this part will not be dehydrated in such path unless a dehydrator 26 has also been incorporated. On the other hand, the resistance of the shunt circuit through the unit 25 is not materially different from the resistance through the main evaporator circuit, and accordingly all of the refrigerant will in time flow through the unit 25.

From the explanation previously given, it will be understood that the temperature within the casing 31 is quite low and may be considerably below 32° Fahr. Accordingly, the moisture content of the entire system can thus be reduced to the aforesaid value around five parts per million, which leaves too little residual moisture in the system ever to freeze up in the capillary tube 17. This is because such a small percentage of water is soluble in the refrigerant at any temperature which will be encountered during operation. Inasmuch as the unit 25 has been subjected to low temperatures, there is a strong possibility that it will be covered with condensed moisture from the atmosphere, and this can be dried off with a hand torch before the unit 25 is disconnected, to prevent the entrance of such moisture into the refrigerating circuit. The valve fittings are then replaced on the valves 23 and 24, and the operation is complete.

Inasmuch as the ability of the silica gel to adsorb moisture decreases with the amount of moisture actually adsorbed, it is good practice to empty the material from the casing 31 after the unit 25 has been used once, and thereafter charging with a new batch of material. The capacity of the new batch may be further assured by heating the unit to a temperature of about 500° Fahr. while passing anhydrous air through the unit.

From the foregoing description, it will be seen that the present invention provides a way greatly to increase the dehydrating effect of a given quantity of a hydrophilic adsorbent by disposing the adsorbent in that portion of the circuit subjected to a very low temperature. It will also be seen that the intrinsic energy of the refrigerant is utilized to maintain the desired low temperature and concurrently decrease the solubility of water in the refrigerant. Thus, under such conditions, even if the motor 11 should thereafter release some moisture in the circuit because of overheating of its insulation, that moisture would also be removed by providing a drier 26 permanently connected in the circuit between the capillary tube 17 and the evaporator 18. It may be of interest to note that under these conditions any particles of water which tend to freeze out in the capillary tube 17 are nevertheless carried therethrough without clogging, and hence are presented to the dehydrator for removal.

While the invention has been described with respect to certain specific embodiments thereof, it should be understood that these are intended to be illustrative and that the scope of the invention is to be considered commensurate with that of the following claims.

I claim:

1. A refrigerating apparatus comprising a compressor, condenser, refrigerant expansion device, drier, and evaporator connected in a closed cyclic path and in the order named, a charge of refrigerant in the apparatus, and a charge of moisture-removing agent in the drier.

2. A refrigerating apparatus comprising a hermetically sealed casing enclosing an electric motor and a compressor driven thereby, a condenser connected to the discharge side of the compressor, a supply line leading from the condenser to a capillary tube, a casing containing a charge of hydrophilic adsorbent connected to the discharge side of the tube, an evaporator connected to the discharge side of the casing, a suction line extending from the evaporator to the inlet of said compressor, and a charge of refrigerant in the circuit formed by said connections, said refrigerant being a solvent for water and said adsorbent having the property of removing water dissolved in said refrigerant.

3. Drying apparatus for a compressor-condenser-expander type of refrigerating machine comprising a casing provided with end covers, filters mounted within the casing and transversely thereof adjacent each end, a capillary tube having one end connected to one end cover for communication with the casing through one of said filters, a connecting fitting on the free end of the tube, a length of discharge tubing connected to the opposite end cover and also provided at its free end with a connecting fitting, whereby said apparatus may be connected into the circuit of said machine between the condenser discharge and the compressor inlet, and a charge of drying agent in said casing between the filters.

4. Drying apparatus for a compressor-condenser-expander type of refrigerating machine comprising a casing provided with end covers, filters mounted within the casing and transversely thereof adjacent each end, a capillary tube having one end connected to one end cover for communication with the casing through one of said filters, a connecting fitting on the free end of the tube, a length of discharge tubing connected to the opposite end cover and also provided at its free end with a connecting fitting, whereby said apparatus may be connected into the circuit of said machine between the condenser discharge and the compressor inlet, and a filling opening provided with a sealing cap extending from the casing between the filters, whereby said casing may be charged and recharged with a drying agent.

5. In a refrigerating apparatus comprising a compressor, a condenser connected to the discharge side of the compressor, an evaporator means connected to the discharge side of the condenser, and a suction conduit connected to the discharge side of the evaporator means and to the inlet side of the compressor, thereby to provide a closed circuit wherein refrigerant is successively compressed, condensed, and expanded; the provision of a refrigerant flow-throttling member interposed between the condenser and evaporator means to govern the flow of condensed refrigerant into the evaporator means, said evaporator means including a drier into which said refrigerant flows after passing said member en route to said compressor through said suction line, said drier comprising a casing having therein a hydrophilic adsorbing agent as a drying medium, said medium having a greater retentivity for water at normal evaporator temperatures than at the increased temperatures of said compressor and condenser.

6. In a refrigerating apparatus of the type having a compressor, condenser, and evaporator connected in series in a cyclic path, a throttling valve means and a casing containing a hydrophilic adsorbent connected between the discharge side of the condenser and the inlet side of the compressor, said compressor and condenser constituting the high pressure side of the apparatus and said evaporator constituting the low pressure side thereof, said valve means having its inlet connected to the condenser thereby to be interposed between the high and low pressure sides, said valve means having its outlet in fluid communication with said casing thereby to position said casing on the low pressure side of the apparatus, whereby refrigerant circulating in the apparatus is expanded through said casing to reduce said casing, said adsorbent, and said refrigerant to a low temperature and concurrently decrease the solvent power of the refrigerant for water and increase the ability of the adsorbent to accept such water.

7. A refrigerating apparatus comprising a high pressure side including a compressor, a condenser, and a refrigerant expansion device connected in series, and a low pressure side forming a closed circuit with said high side, said low pressure side including an evaporator and a suction line connecting the evaporator to said compressor, said low pressure side further including a casing enclosing a hydrophilic adsorbent material having an increased capacity for water at operating temperatures existing on the low pressure side of said apparatus.

JENS TOUBORG.

REFERENCES CITED

The following references are of record in the file of this patent:

UNITED STATES PATENTS

| Number | Name | Date |
| --- | --- | --- |
| 2,274,943 | Touborg | Mar. 3, 1942 |
| 2,279,928 | Shoemaker | Apr. 14, 1942 |
| 1,670,348 | Hain | May 22, 1928 |
| 1,866,659 | Litle | July 12, 1932 |